Z. B. Sims,
Cotton Gin.
No. 94,352.          Patented Aug. 31. 1869.
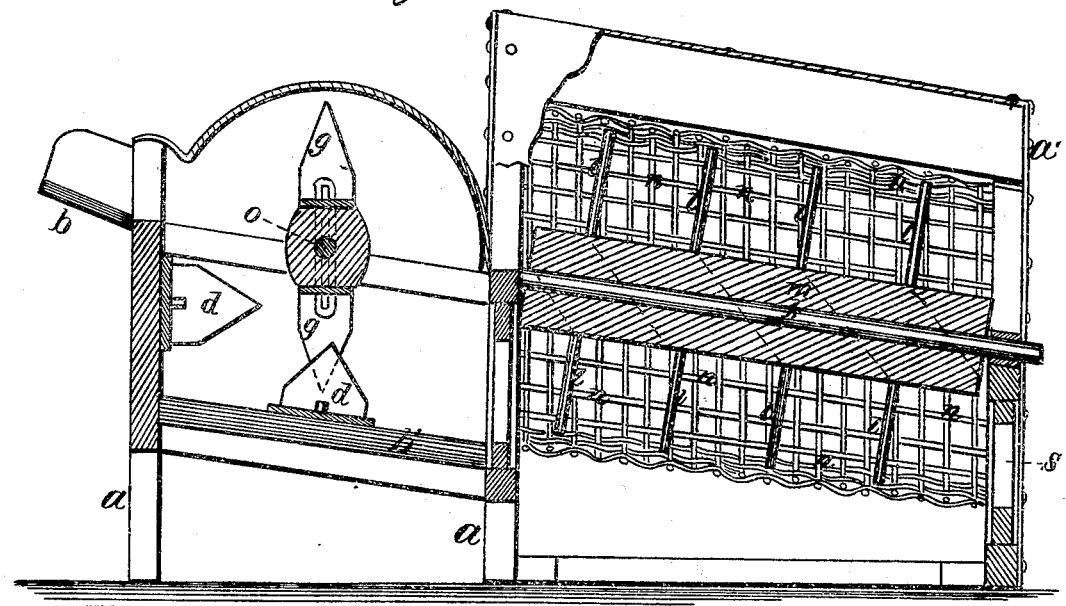
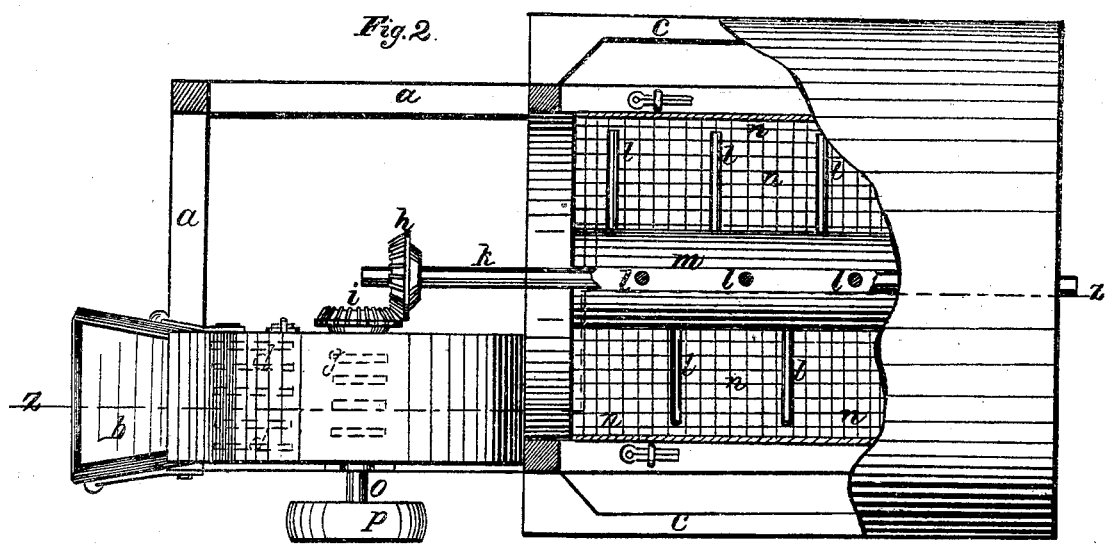

United States Patent Office.

ZACHARIAH B. SIMS, OF BONHAM, TEXAS.

Letters Patent No. 94,352, dated August 31, 1869.

IMPROVEMENT IN COTTON-PICKER AND CLEANER.

The Schedule referred to in these Letters Patent and making part of the same.

*To all whom it may concern:*

Be it known that I, ZACHARIAH B. SIMS, of Bonham, in the county of Fannin, and State of Texas, have invented a new and useful Improvement in Cotton-Pickers and Cleaners; and I do hereby declare the following to be a clear and exact description of the nature thereof, sufficient to enable others skilled in the art to which my invention appertains, to fully understand and use the same, reference being had to the accompanying drawings, making part of this specification, in which—

Figure 1 is a longitudinal section in the line $z\ z$, fig. 2, and

Figure 2 is a top view, a portion of the cover being removed to show the parts of the machine.

My invention relates to improvements in picking cotton before it is ginned, which will hereafter be more fully set forth.

It is customary in picking cotton in the field to carefully remove the cotton from the bolls, and then bring it to the gin-house. Inclement weather, and other causes, by this method, frequently prevent field-work, and, to obviate this objection, I pull off the branches of the cotton-stalks, which contain from three to twenty bolls each, and remove them to the gin-house, where it is intended the picker should operate.

The picker breaks up the bolls and branches, which escape, through a wire grating, whilst the cotton unginned is automatically removed from the picker. By this arrangement, a great deal of time and labor is saved.

The picker is intended to be employed when the branches and bolls are dry.

In the accompanying drawings—

$a\ a$ is the frame of the picker, and $b$ is the hopper, or feed-trough, for the introduction of the branches containing the bolls.

$d\ d$ are fixed breakers, or teeth, attached to the frame $a$, and $g\ g$ are similar breakers, attached to the shaft $o$.

$k$ is a shaft, having a concentric cylinder, $m$, surrounding it, to which are attached the pins, or arms $l\ l$, which are arranged spirally around the cylinder $m$, in order to carry the cotton out of the cleaner.

Motion is given the shaft $k$, through the pinion $h$, on that shaft gearing into the pinion $i$ on the shaft $o$, to which motion is given by a belt passing around the pulley $p$, or otherwise.

$n$ is a wire grating, surrounding the cylinder $m$, armed with the spirally-arranged pins $l\ l$.

The top portion of the wire grating is removable.

$s$ is a hole, made in the rear end of the frame, above the lower side of the grating, for the escape of the unginned cotton.

It will be observed, that the axis $k$ of the cylinder $m$ is inclined, to facilitate the escape of the cotton.

Pins are attached to the side-pieces $c\ c$ of the frame $a$, to the ends of the frame $a$, and to the upper part of the piece $a$ attached to the wire-grating cover. To these pins are fastened a cloth, to prevent the escape of dirt, and particles of the broken branches and bolls of the cotton-plant, into the gin-house.

It is designed that part of the picker, lying immediately under the wire gauze, should be placed over a hole made in the floor of the gin-house, for the escape of dirt.

The operation is as follows:

The branches containing the cotton-bolls, and such bolls as are broken off, are placed in the hopper $b$; the branches and outer coverings of the cotton in the bolls are broken to pieces by the breakers $d\ d$ and $g\ g$, the latter feeding the material down an inclined way into the cleaner. The arms $l\ l$ of the cylinder clean the cotton, the dirt and particles of the branches, and outer covering of the bolls, passing through the wire grating and through the hole in the floor of the gin-house, while the inclined position of the cylinder, together with its spirally-arranged teeth, causes the unginned cotton to pass through the hole $s$ in the frame into the gin-house.

Having thus fully described my invention,

What I claim as new, and desire to secure by Letters Patent, is—

1. The rotary breakers or teeth $g\ g$, in combination with the fixed breakers $d\ d$, and inclined-way $b$, substantially as described.

2. The breakers $g\ g$, $d\ d$, and inclined-way $b$, in combination with the inclined-cylinder $m$, spirally-arranged teeth $l\ l$, wire-grating $n$, and cloth, substantially as described.

ZACHARIAH B. SIMS.

Witnesses:
JOHN A. WIEDERSHEIM,
W. J. PEYTON.